United States Patent [19]

Lusas et al.

[11] Patent Number: 5,296,253

[45] Date of Patent: Mar. 22, 1994

[54] INTERMEDIATE MOISTURE LEGUME AND CEREAL FOOD PRODUCT AND METHOD OF PRODUCING

[75] Inventors: Edmund W. Lusas, Bryan; Gabriel J. Guzman, College Station, both of Tex.

[73] Assignee: Texas A&M University, College Station, Tex.

[21] Appl. No.: 890,535

[22] Filed: May 28, 1992

[51] Int. Cl.$^5$ .................................................. A23L 1/20
[52] U.S. Cl. ................................. 426/629; 426/321; 426/549; 426/559; 426/618; 426/634
[58] Field of Search ................ 426/549, 559, 634, 618, 426/321, 629

[56] References Cited

U.S. PATENT DOCUMENTS

| | | |
|---|---|---|
| 3,745,021 | 7/1973 | Van Middlesworth et al. |
| 3,922,353 | 11/1975 | Bernotovicz ............ 426/559 |
| 4,185,123 | 1/1980 | Wenger et al. |
| 4,910,038 | 3/1990 | Ducharme |

Primary Examiner—Donald E. Czaja
Assistant Examiner—Mary S. Mims
Attorney, Agent, or Firm—Cox & Smith Incorporated

[57] ABSTRACT

A method of producing an edible, shelf-stable legume and/or cereal food product comprises cooking a substrate such as legume seeds and/or cereal grains under conditions effective to maintain a total content of water in the substrate at about 20 to 60 wt % and inactivate microorganisms, lectins, enzymes, trypsin inhibitors, and hemagglutinins, while increasing protein and starch digestibility and palatability, admixing the cooked substrate with an ingredient selected from the group consisting of fats or oils, sweeteners, humectant agents, salts, edible acids, flavorings and preservatives, cooking under conditions effective to pasteurize the admixture and produce a flowable food product having a total water content of about 20 to 45 wt % while preventing the protein from further denaturing, and cooling and forming the food product into a desired shape. An edible, shelf-stable legume and/or cereal food product is prepared by the method described above. The product has a water activity ($A_w$) of 0.65 to 0.87, pH of 4.0 to 6.0 and a moisture content of 20 to 45 wt %.

15 Claims, No Drawings

INTERMEDIATE MOISTURE LEGUME AND CEREAL FOOD PRODUCT AND METHOD OF PRODUCING

BACKGROUND OF THE INVENTION

1. Field of the Invention

This invention relates to an edible, shelf-stable legume and/or cereal food product that is nutritious, tasty and palatable. This invention also relates to a method of processing legumes and cereals, alone or in combination, to produce the food product.

2. Description of the Background

The nomenclature of "field-dried legumes" is generally intended to describe mature dried seeds of many types of beans, peas, and lentils grown as field crops, that are broadly consumed by man across the world. Although soybeans (*Glycine max L. Merr.*) and peanuts (*Arachis hypogaea L.*), which are also known as "ground nuts", are classified as legumes, the energy for the young plant in these seeds is stored primarily in the form of oil. In contrast, the oil content in "field-dried legumes" is low, usually under 3 wt %, with much of the energy for the seedling being stored in the form of starch, e.g., about 35 to 40 wt %, which is only a minor component of soybeans and peanuts, e.g., about 1 wt % and 5 wt %, respectively.

In the present context, mature, field-dried legume seeds will simply be referred to as "legumes" to avoid confusion when describing wet or dry processing intermediates and products. In the context of this invention, the term legumes encompass low-fat, high-starch legumes, as well as mixtures thereof with high-oil type legumes, provided that the total amount of oil contributed by the high oil type legume to the product does not interfere with its processing or achievement of desirably textured products.

Legumes include many genuses and species, among which are the following. *Phaseolus vulgaris L.* is perhaps the best known group of beans in the Americas and Northern Europe. This group of beans includes common field bean species like black, cranberry, Great Northern, kidney, navy, pink, pinto and large and small white beans. The chickpea, *Cicer arietinum L.*, also known as the garbanzo bean and Bengal gram, is a basic food in eastern Mediterranean countries, Northern Africa and Southwest Asia. The black-eye pea, *Vigna unguiculata,* is a major protein source in Central Africa, which was brought to the New World where milder-flavor varieties like the cream pea are also used. The mung bean or green gram, *Vigna radiata,* is best known in the United States as the source of bean sprouts, but is consumed in many additional ways in Eastern and Southern Asia. *Vicia faba L.,* known as the faba bean, broad bean, horsebean, and occasionally as the field bean, has long been a food of the "poorest of the poor of the world", and is used in Eastern Europe, and Northern Africa. Other beans of widespread use are the pigeon pea and red gram of Egypt, India and Brazil or *Cajanus cajan* sometimes growing as a perennial bush; the Kesari dahl or chicking vetch or *Lathyrus sativus L.*, grown and eaten during droughts in India that may cause nervous paralysis of the lower limbs among young men if not properly prepared; the lima bean or *Phaseolus lunatus L.* requiring thorough cooking to inactivate hemagglutinin; and the escumite or tepary bean or *Phaseolus acutifolius* Gray var of Northern Mexico and Southwest United States, highly toxic in the raw state. Other commonly-used dry legumes include lentils such as *Lens culinaris L.* and *L. esculenta L.*, and dry green and yellow peas or *Pisum sativum L.*, frequently used in North America and Northern Europe.

As a group, legumes are a rich source of nutrients, generally containing about 17 to 25 wt % protein on a dry weight basis, and about 58 to 68 wt % carbohydrates, much of which are in complex forms favored by nutritionists. Further, field beans, peas and lentils are sources of water-soluble vitamins, potassium and magnesium, dietary fiber and natural antioxidants.

Advantages of legumes include short growing periods enabling their production in areas with limited frost-free days and/or short rainy seasons, relatively high protein yield per unit of land, and long-term storability of the seeds given their low fat content and natural resistance to insects.

Legumes, however, also have disadvantages. Many varieties of beans, including those used in the United States, have high levels of trypsin inhibitors, hemagglutinins and other toxic compounds or anti-growth factors that must be removed by leaching and/or deactivation by cooking. In addition, legumes contain about 3 to 7 wt % flatulence oligosaccharides or sugars such as raffinose, stachyose, verbascose, and ajugose, among others. These oligosaccharides are not digested and absorbed in the human stomach or small intestine due to a lack of suitable enzymes. They pass into the large intestine, where they are metabolized by random colon bacteria, sometimes producing odiferous gases and discomfort.

Beans are often unpopular in sophisticated societies due to their producing intestinal discomfort and gas venting, and because they are a staple of the poor. In addition, beans typically require lengthy cooking. Their cooking time may, however, be reduced by presoaking, a process that also leaches out some of the stronger flavored components and hull pigments. Seeds of most varieties, however, develop a "hard shell" during storage, a condition in which water uptake is greatly retarded and the cooking time of the bean is significantly increased as the crop ages. Unfortunately, the areas of the world where beans are the last resort of storable, concentrated food protein often are also faced with shortages of water, and especially fuel to cook them adequately for their safe use.

Cereal crops such as wheat, corn or maize, rice, barley, oats, sorghum and millet also are storable and are widely used as food stuffs. Although their protein content, generally about 8–13 wt %, and up to 19 wt % for oats, is lower than that of legumes, cereal grains are eaten in greater quantities than legumes or soybeans and are the major sources of plant protein in the world's human diet. Cereal seeds account for as much as 70 wt % of the total caloric intake of humans in some regions.

The protein contained in cereal seeds includes a good supply of the sulfur-containing essential amino acids methionine and cystine, but is otherwise nutritionally unbalanced due to an insufficient content of the essential amino acid lysine. In contrast, the protein of legumes and soybeans is high in lysine but low in the sulfur-containing amino acids. Nutritionists have found that cereal grains and either legumes or soybeans optimally complement one another when mixed in an approximate proportion of about 7:3 wt:wt; this results in a total dietary protein content that has the approximate nutritional quality of meat protein.

Given the high nutritional quality that a mixture of legumes and cereals provides, it would be highly desirable to have a ready-to-eat, shelf-stable precooked food product made of legumes and/or cereals that would be inexpensive to prepare and could be made available to the population at large, including the poorest segments of the population.

SUMMARY OF THE INVENTION

This invention relates to a method of producing an edible, shelf-stable legume and/or cereal food product, comprising cooking a substrate selected from the group consisting of legume seeds and cereal grains under conditions effective to maintain a total content of water in the substrate at about 20 to 60 wt % and inactivate microorganisms, lectins, enzymes, trypsin inhibitors and hemagglutinins, while increasing protein and starch digestibility and palatability;

admixing the cooked substrate with an ingredient selected from the group consisting of fats or oils, sweeteners, humectant agents, salts, edible acids, flavorings and preservatives to obtain a final product water activity ($A_w$) of less than 0.87;

cooking under conditions effective to pasteurize the admixture and produce a flowable food product having a total water content of about 20 to 45 wt % while preventing the protein from further denaturation and minimizing shearing of the contained starch; and cooking and forming the food product into a desired shape.

This invention also relates to an edible, shelf-stable legume and/or cereal food product prepared by the method of the invention.

Other objectives, advantages and features of the present invention will become apparent to those skilled in the art from the following discussion.

DESCRIPTION OF THE PREFERRED EMBODIMENTS

This invention arose from a desire by the inventors to provide an inexpensive protein and calorie source that is also tasty and pleasant to the palate, shelf-stable and ready to eat. Such foodstuff may be manufactured for delivery to even remote parts of the world for local consumption. In addition, a product like the one provided by this invention will be of great benefit to the poorest segments of humankind, that are normally malnourished, particularly with respect to the protein content of their diets.

The product of the invention preferably contains about 8 to 20 wt % protein, about 2 to 20 wt % fat and about 15 to 35 wt % water and has a water activity ($A_w$) of about 0.65 to 0.87, and a pH of about 6.0 or less. A further preferred product contains about 8 to 14 wt % protein, about 6 to 8 wt % fat and about 25 to 35 wt % water, and has an $A_w$ of about 0.75 to 0.85, and a pH of about 5.0 to 5.5.

The color of the product may resemble the color associated with the substrates cooked by traditional methods. Optionally, natural or artificial colorings may be added to enhance the product's appearance.

Optionally, dispersed pieces of colored texturized vegetable/animal protein resembling bacon bits or pieces of manufactured cereal products including rice, corn, wheat, and/or oats shaped as kernels, and optionally coated with an edible film, may be included. The texture of the product may also be characteristic of polenta, cooked pasta, corn grits, corn and rice puddings, gruels and mush. The flavor may also be characteristic of legume foods.

The product of the invention may be provided as a paste or be shaped into blocks, bars or pieces of any desired size or shape. The product may also be shaped into small-piece finger foods, and/or may be coated with flexible or rigid coatings or films, resembling confections.

The dry legumes may be size-reduced either directly into a flour meal, e.g., to pass a U.S. 40 sieve, in a manner that is least damaging to starch granules, or optionally by first softening the legumes by soaking in water for about 2 hours or longer, followed by suitable milling.

Edible oil may be added in an amount of about 1 to 3 wt %, and emulsifiers may be added in an amount of about at 0.2 to 2.0 wt % to the raw meal to reduce the binding or puffing of the starch that is released from disrupted kernels or granules during initial grinding and extrusion.

Water may be added to adjust the moisture content of the mixture to about 15 to 60 wt %, followed by extrusion-cooking to cook the starch and enhance its digestibility, and to deactivate natural toxic components and anti-nutritional compounds with minimum physical damage to starch granules. The extruder may be operated at a feed rate of about 100 to 300 lb/hr and about 150 to 400 rpm. The temperature of extrusion may be about 212° to 350° F., and the exit pressure about 200 to 2000 psi. This feed rate is based on pilot plant experience. However, conditions for commercial extruders to produce similar products may vary, and capacities may be many times larger. However, an artisan will know how to vary the conditions to obtain a tasty and nutritious product with minimal experimentation.

The extrudate may be ground into, e.g., a meal, or by cutting or shearing with a suitable mill to form shreds or chunks for later use as ingredients or food.

Granular cereal fractions may be prepared by direct milling or, as is done with corn or maize, by first soaking and boiling with lime or calcium hydroxide or sodium hydroxide, to produce the alkali-treated "nixtamalized" flavor of Mexican foods. The cereals may be processed alone or mixed with legumes and/or soybeans. The moisture content may be adjusted to about 15 to 60 wt %, followed by, e.g., extrusion-cooking to cook the starch and enhance its digestibility and to deactivate natural toxic components and anti-nutritional compounds with minimum physical damage to starch granules. As an example, the extruder may be operated at a feed rate of about 100 to 300 lb/hr and about 150 to 400 rpm, and the temperature of extrusion may be set at about 212° to 350° F. with an exit pressure of about 200 to 2000 psi. Other suitable conditions, depending on design and size of the extruder, may also be utilized.

Intermediate products may optionally be partially dried to enable the formulation of a final product having a moisture content of about 15 to 40 wt %.

A blended mixture may be prepared that comprises at least about 25 wt % of ground or chunk-style extruded legumes, or legume-cereal products with suitable ingredients to obtain any desired flavor, texture and shelf-stability. Polyhydric alcohols may be added to the mixture in an amount of about 5 to 15 wt %, fat in an amount of about 1 to 10 wt %, sugars in an amount of about 10 to 25 wt %, and water in an amount of about 10 to 30 wt % of the mixture. Emulsifiers may be added in an amount of about 0.2 to 1.0 wt %, and colorings and preservatives including antimicrobial, fat antioxidants and anti-browning agents may be added according to established limits set by the Code of Federal Regulations. Seasonings may be added at suitable levels to produce a food of desirable taste and aroma, as an artisan would know. The components may then be mixed, preferably under vacuum, until they are solubilized and uniformly dispersed to attain dough-like consistency.

A most preferred technology for cooking is steaming, preferably of presoaked beans and/or dried cereal grains.

The blended mixture may be pasteurized, e.g., in an extruder configured to rapidly heat the product with minor shear. As an example, the extruder may be operated at a feed rate of about 100 to 200 lb/hr. and about 50 to 150 rpm. The temperature of extrusion may be preferably about 212° to 300° F., with an exit pressure of about 50 to 500 psi.

The pasteurized product may then be formed into any suitable shape and size and then be packed, optimally, with exhaustion of air and its replacement with nitrogen or another appropriate gas in a rigid or flexible container made from a low moisture and oxygen permeability material, followed optionally, by encasing the packaged unit in a protective container to prevent puncturing.

The product of the present invention is prepared by a method that is generally described below.

Thus, this invention provides a method of producing an edible, shelf-stable legume and/or cereal food product, that comprises cooking a substrate selected from the group consisting of legume seeds and cereal grains under conditions effective to maintain a total content of water in the substrate at about 20 to 60 wt % and inactivate microorganisms, lectins, enzymes, trypsin inhibitors, and hemagglutinins, while increasing protein and starch digestibility and palatability;

admixing the cooked substrate with an ingredient selected from the group consisting of fats or oils, sweeteners, humectant agents, salts, edible acids, flavorings and preservatives;

cooking under conditions effective to pasteurize the admixture and produce a flowable food product having a total water content of about 20 to 45 wt % to obtain a final product water activity ($A_w$) of less than 0.87 while preventing the protein from further denaturation; and cooking and forming the food product into a desired shape.

In a preferred embodiment of the invention, the method further comprises reducing the size of the seeds or grains to produce a paste. In another preferred embodiment, the method further comprises sealing the food product in a material having low ultraviolet light transmission and low oxygen and moisture permeability.

In one aspect of the method, the first cooking step may be conducted at a temperature of about 180° to 275° F., more preferably about 190° to 250° F. The temperature is preferably lowered towards the end of the cooking step to about 130° to 215° F., and more preferably to about 145° to 200° F. However, other temperatures may also be utilized depending on what proportion of legumes and cereal grains is utilized. Steaming under pressure is highly preferred for this cooking step.

As further discussed below, the legume seeds may be selected from the group consisting of beans, peas, lentils, nuts, and, in small precentages, soybean seeds. Preferred are beans and peas. The cereal grains may be selected from the group consisting of corn, rice, wheat, sorghum, oats, barley, milo and millet grains. Preferred are corn, wheat, sorghum, and rice.

In another aspect of the invention, the second cooking step may be conducted at a temperature of about 180° to 240° F., and more preferably about 190° to 230° F. The temperature may then be lowered towards the end of the cooking step to about 160° to 215° F., and more preferably about 175° to 200° F.

Water may be mixed with seeds and/or grains in a proportion of about 1.00:0.75 to 1.00:14.00 wt:wt, and more preferably about 1.00:1.50 to 1.00:10.00 wt:wt. However, other proportions may also be utilized to attain products with different degrees of gelling and consistencies. It should be remarked that the solids may be composed entirely of legume seeds, grain seeds or a mixture of the two in varying proportions. This will also determine the amount of water required to obtain a similar moisture product.

The first cooking step may be conducted by a variety of ways. Technologies known in the art that are suitable for use in the first cooking step are steam cooking under pressure, extrusion cooking and boiling, among others. Similarly, the second cooking step may be conducted by extrusion cooking, contact heating and the like. The conditions suitable for the two cooking steps are described below in further detail.

The method of the invention may optionally comprise an additional step, soaking the seeds and/or grains in an aqueous medium prior to the first cooking step.

In another aspect of the invention, the method further comprises a step involving cracking and milling the soaked seeds or grains, and thereafter removing the hull, bran or germ prior to the first cooking step. This technology is described in further detail below.

Optionally, when the substrate is cereal grains, or a mixture thereof with legumes, the grains may be soaked in a calcium hydroxide or similar alkaline solution prior to the first cooking step as described below.

The method of the invention may further comprise grinding the dried seeds into a meal, flour or grits while preserving the starch structure in granule or mealy form prior to the first cooking step. The technology and conditions for conducting this step are also further described below.

The product obtained by the present method is an edible, shelf-stable, tasty food that is pleasant to the palate as well as nutritious. This edible food product preferably has a water activity ($A_2$) of about 0.65 to 0.87, a pH of about 4.0 to 6.0 and a moisture content of about 20 to 45 wt %. In a most preferred embodiment, the edible food product has an $A_w$ of about 0.70 to 0.85, a pH of about 4.5 to 5.5 and a moisture content of about 25 to 35 wt %.

The measurement or calculation of the water activity is done as described in Scott, W. J., Water Relations of Food Spoilage Microorganisms Advances in Food Research 7:83–127(1957).

The edible food product of this invention may be provided in a variety of shapes and forms. By means of example it may have the form of a bar, cubes, a pie, nuggets or bean-shaped pieces.

In addition to the above-indicated ingredients, the edible food product of the invention may contain other ingredients such as dried fruits, dried vegetables, texturized protein products, candy, chocolate, cheese, dried meats, flaked, granulated or extruded cereals, or edible nuts and seeds, typically in the forms of pieces, internal layers or coatings. In addition, the edible food product may also contain ingredients such as flavorings, spices and coloring agents that are safe and digestible. These are known in the art and need not be further described herein.

The edible food product of this invention may be provided in unit form or as a multiple unit package or container. It may be shrink-wrapped, presented in a half-tray fashion or in canned form. However, other forms of packaging utilized for the preservation of foods may also be utilized.

The present method provides for the cooking of whole or ground legume or cereal seeds by a variety or combination of procedures including boiling water, flowing or pressurized steam, heated jacket mixer or with a cooking extruder to attain one or more of the following effects.

Soften the seed or its meal or flour.

Increase digestibility of its starch and proteins.

Destroy heat-labile anti-nutritional or toxic components like trypsin inhibitors, hemagglutinins, lectins and other compounds.

Destroy natural enzymes that may cause undesirable flavors in the finished product.

Destroy a majority of microorganisms such as yeast, mold and bacteria, that might be present with the dry seed.

The method described herein size-reduces cooked whole seeds, clumps of grits or flour that may have formed during cooking, or extruded cooked particles to produce a paste, wet granular powder or chunks.

In addition, the present method mixes the resulting size-reduced moisture- or extrusion-cooked legume or cereal seeds with other ingredients including but not limited to fats and oils, sugars and sweeteners, humectants, salt, edible acids, flavorings, approved freshness preservatives for the fats and oils, and antimicrobial preservatives as required to achieve a desired flavor and osmotic pressure as measured by its water activity, $A_w$, and conditions that inhibit microbial growth in the finished product.

The method of this invention also heats the thus obtained mixture, e.g., with a heating extruder or other suitable device to melt, intimately mix, heat-degasify, pasteurize or sterilize the ingredients and produce a paste or flowable material.

The product may then be wrapped and/or sealed, and further packed in a variety of flexible multi-laminated pouching materials or suitable rigid containers of materials such as metal, glass and plastic having low oxygen and moisture permeability and low U.V. light transmission characteristics, while optionally vacuumizing and packaging in the presence of an inert gas like nitrogen, among others.

A variety of technologies may be used to accomplish the above steps while preparing products with different physical characteristics and flavors. Examples of these technologies are as follows.

Whole legume or cereal seeds, such as dry pinto beans, corn and rice, may be soaked in water until swollen and hydrated, as is known in the art. Optionally, the surface water may be drained and replaced with fresh water, thereby discarding undesirable flavor and color components leached out from the seeds. The whole seed may then be cooked in boiling water until rendered soft and tender to increase the digestibility of starch and proteins and deactivate and destroy undesirable components such as trypsin inhibitors, hemagglutinins and lectins, among others.

Alternatively, the soaked seeds may be drained and cooked in a continuous flowing steam cooker or in a pressurized batch agitated machine, such as a steamer or modified tumble dryer, among others.

Optionally, the soaked seeds may be ground, and then cooked, e.g., in a contact surface heater by flowing steam in a continuous atmospheric cooker or under pressure in a continuous or batch cooker of suitable design. If desired, the seeds may be cracked, milled and separated to remove the hull or bran, as well as the fat-containing germ, by a number of techniques well known in the cereal and oilseed processing industries.

It is well-recognized in the art that enzymes naturally present in the seed, such as lipases and lipoxygenases, may undesirably alter the flavor of certain seed products by reacting with fat present therein and other components. Heat-processing of presoaked whole seeds to deactivate flavor-causing enzymes, in general, must proceed very rapidly after grinding if species like legume seeds are ground, but generally is not mandatory with cereal seeds like corn, rice or wheat.

Corn or maize and sorghum may be first soaked or boiled with lime or calcium hydroxide, or with a sodium hydroxide solution to produce the alkali-treated "nixtamalized" flavor that is typical of Mexican-type foods.

Optionally, dry seeds may be ground into a flour or grits and then cooked, e.g., by flowing steam in a continuous atmospheric cooker with sufficient moisture, or in a continuous or batch pressurized cooker with the addition of a controlled amount of water to obtain any desired moisture content. Some of the water may be added to the product in the form of, e.g., injected steam of food processing or culinary grade.

It is important in most cases that the shearing of starch or disintegration of the dry or swollen granule be kept to a minimum to retain a grainy-textured product. This is particularly important during hot water and/or steam cooking of the seed, and during subsequent mixing of the cooked seed and pasteurization-extrusion of the final product. This is preferably accomplished by using, e.g., attrition-type grinders, heating devices with sufficient clearances and/or large-enough orifices to allow the passage of intact starch, and its gentle pumping and conveying. Emulsifiers, like glyceryl monostearate and others known to complex with starch in other food processing operations, like the manufacture of instant mashed potatoes, may be added at different points in the process to assist in keeping the starch in granule or "mealy" form.

The desired free moisture content of the cooked product, namely a water activity of less than 0.87, is a prime consideration in selecting the equipment and processing conditions. The characteristics of the final product are preserved by controlling its water activity. Thus, a higher moisture content of the cooked legume or cereal grain fraction require proportionately greater ratios of osmotic pressure-inducing ingredients, including but not limited to glycerine (glycerol), various sugars and carbohydrate sugars and salt, as well as a reduction in the amount of the moist cooked grain fraction. The moisture content may be optionally controlled by selecting the amount of water added initially to the whole or ground seeds, and/or by cooking at pressurized temperatures, e.g., over 212° or 100° C., or by reducing any excess water from the cooked seed, extruded particles, or size-reduced granules by drying in a variety of devices, e.g., atmospheric tray, belt, kiln or rotating cylinder and drum dryers, or with vacuumized stir-type heaters of batch or continuous design, combinations of surface heaters and vacuumized flash chambers, or with surface-heated vacuumized mixers and tumble dryers.

Legume foods like pea, bean or lentil soups, refried beans, bean dips, canned pork and beans, e.g., canned beans generally used in cold salads, characteristically have a mealy texture. Cereal-based food counterparts with grainy structure include polentas, farinas, corn grits, corn and rice puddings, gruels and mush. This texture is optionally preserved by avoiding any excessive shearing during grinding and extrusion, and by adding suitable emulsifiers, like glyceryl monostearate and others, known to complex with starch, and fats and oils which naturally act to inhibit expansion of starchy and proteinaceous materials during cooking and extrusion. Emulsifiers, fats and oils may also be mixed with the dry ground seed fraction to retain a mealy texture in the cooked or extruded cereal or legume preparation. These ingredients may also be added to the ground cooked wet whole seeds, to the presoaked ground seeds before cooking, and to the final mixture of cooked and extruded legumes and cereals when formulating the final mixture before pasteurizing and/or shaping the food product.

The dry materials may be size-reduced, e.g., by grinding them into powders or meals with minimum damage to starch granules. This may be accomplished with conventional equipment.

Ground or chunk-style extruded legumes, cereals and legume-cereal mixtures may be mixed with other osmotic pressure-controlling ingredients, as described previously, to obtain final product water activities $A_w$ of about 0.65 to 0.87, and preferably about 0.75 to 0.87; with edible acids to reduce the pH of the product to about 4.5 to 6.0, and preferably about 5.2 to 5.7; with food grade antimicrobial preservatives to retard growth and product spoilage by yeasts, molds and/or bacteria; with preservatives to prevent deterioration of fats, oils and other lipid-containing components; and with suitable flavorings and spices and texture-imparting ingredients like modified starches and other thickeners to give the final product a desired flavor and mouthfeel.

The final mixture may then be heated to melt and co-mingle the ingredients and to unify them into a cohesive mass and to pasteurize and reduce the number of heat labile microorganisms in the product. A cooking-type extruder will perform this function very well, but internal tolerances should be kept as indicated above to avoid substantial shearing of the starch. The exit temperature should not appreciably exceed 100° C. to avoid expansion or puffing of the starch while enhancing the evaporation of some moisture. Other heating devices may be used, such as a scrape surface heat exchanger, or a mixer provided with a heated jacket, e.g., the twin-sigma blade design. Some moisture may thus be evaporated from the heated product exiting the extruder. This operation my be enhanced by using vacuumized mixers to both deaerate and further reduce the moisture content of the product, if desired. By formulation, and subsequent extrusion and drying, products may be produced of a moisture content of about 20 to 45 wt %, and preferably about 25 to 30 wt %.

The product may be shaped into rolls or rectangular bars as it exits the extruder die. Optionally, the extruded mass may be cooled, and deaerated, and then extruded to produce bars and various shapes like beans, cubes, and the like, with shaped pieces. The hot, flowable product may also be filled into a preformed container where it will assume the container's shape. The ingredients in the product are preferably pasteurized together as described above. If heat-labile additives, having pieces that might melt or be sheared during extrusion or pasteurization, or flavorings that might be volatilized on exiting hot from the pasteurization step, are added in a final cold mixing operation, it should be ensured that they have a low microbial count or be pasteurized before addition to the product for final shaping.

The product may comprise of one or more low-fat legumes, one or more cereal grain sources, mixtures of low-fat legumes and cereal grains, high-fat legumes like cooked or roasted peanuts, soybeans or tree nuts to impart crunchy textures, colored materials like dehydrated or candied fruits and vegetables, and flavored chunks, among others. It may be formed into bars with layers of contrasting materials, pieces resembling jelly beans, reformed beans or other shapes, center-filled bars and food pieces of two or more contrasting materials, and pieces enrobed or coated with various other materials like fats and carbohydrate materials, among others.

The packaging material should provide the product with protection to ensure an extended shelf life. Heat-sealable, multi-laminated barrier materials with low oxygen, moisture permeability, that are light-proof or have low permeability of ultra-violet light, are preferred. The packaging material is preferably shrunk around the product to minimize moisture volatilization and/or condensation against the cool packaging surface. After filling, the package may be vacuumized and flushed with an inert gas. As an alternative to flexible packaging, rigid plastic, glass or metal packages may be used, but they should be filled with the product as fully as possible.

The product may be packaged in single-serving units, but it may also be provided as multiple portion units in shrunk flexible packages or even filled into containers like sealed cans or in institutional feeding-type half trays. Sales packages of the product should be packaged in suitable protective shipping containers to prevent puncturing.

The thus prepared products are referred to as "shelf-stable". Samples of products according to this invention have been preserved for over three years in ambient conditions. During such time, microorganisms have not grown. However, a knowledgeable food scientists would recognize that selected microorganisms might grow under extreme conditions and that it is prudent practice to view all stable food products soley as being "commercially sterile" or "commercially stable". In addition, many chemical reactions, even in sterile foods, are heat-catalyzed and are accelerated by storage at high temperatures while remaining extremely slow at lower temperatures. The products of this invention do not require refrigeration to prevent spoilage. Many formulations of the product of the invention will, however, retain optimum flavor, color and texture longer if they are warehoused at moderate temperatures, e.g., 20° C. or lower, or they are refrigerated, e.g., at temperatures of less than 10° C. temperatures.

Having now generally described this invention, the same will be better understood by reference to certain specific examples, which are included herein for purposes of illustration only and are not intended to be limiting of the invention or any embodiment thereof, unless so specified.

EXAMPLES

PREPARATION OF SHELF-STABLE BEAN-TYPE BAR FROM COOKED WHOLE BEANS

Example 1

Preparation of Precooked Beans 100 lbs of pinto beans were covered with warm water at about 30° C., and allowed to soak for 18 hrs. The surplus water was discarded and the beans were placed in a tumble dryer (Gemco, Middlesex, N.J.), modified to permit heating its double cone with direct steam. The soaked beans were heated with a steam jacket pressure of 20 psig, reaching internal chamber conditions of 120° C. and 15 psig. Samples were taken periodically. After 45 min of heating, the centers of the beans were soft and had a cooked bean flavor. The moisture content of the cooked beans was 56 wt %. The beans were dried for 2 hrs at a pressure of 25 in/Hg with an internal vacuum, and a steam jacket pressure of 20 psi, reaching an internal chamber temperature of 120° C. The moisture content of the dried cooked beans was 49 wt %.

The beans were then passed through a meat grinder equipped with a plate containing ¼ inch holes.

Example 2

Preparation of Beans from Steam Precooked Bean Meal

A formulation consisting of the ingredients shown in Table 1 below was prepared using a twin sigma arm mixer (J. H. Day Company, Cincinnati, OH).

TABLE 1

| Ingredients | Formulation (lbs) |
|---|---|
| Precooked Pinto Beans (Prepared as in Example 1) | 15.286 |
| Dry beans | 7.610 |
| Water from soaking | 7.670 |
| Refined cottonseed oil (Lou Ana Food Co.) | 1.250 |
| Sugar | 1.100 |
| Corn syrup (Archer Daniel Midland 62 DE/43 Be') | 3.500 |
| Modified starch (American Maize Co. Polar Gel C ™) | 1.000 |
| Glycerol | 1.000 |
| Sorbitol | 1.038 |
| Salt | 0.313 |
| Citric acid | 0.050 |
| Lactic acid | 0.050 |
| Glyceryl monostearate emulsifier (Eastman Chemical Products, Inc. Myvaplex 600 ™) | 0.250 |
| Potassium sorbate solution (50% in water) | 0.150 |
| Refined cottonseed oil with 1 wt % tertiarybutylhydroquinone (TBHQ) and and butylated hydroxytoluene (BHT) (Eastman Chemical Products, Inc.) | 0.013 |
| Total | 25.000 |

The emulsifier was included to retard hardening of the bar after processing. This presumably occurs by complexing starch disrupted during mixing and extrusion of food ingredients. The potassium sorbate was dissolved in the water and all ingredients were combined in a twin sigma blade mixer (J. H. Day Company), and mixed under vacuum (10 in Hg) to deaerate the mixture. The resulting dough was then fed into an extruder (Wenger Manufacturing Company X-20), with barrel and screw configured to rapidly heat the product with minor shear. The product exited the extruder through a straight ⅜ in pipe at 210° F. The product was pressed into sheets ⅜ in thick, cooled, and sliced into 4 by 1 3/16 in bars. The bars were placed in multi-laminate clear pouches (FreshPak 500, Koch Supplies, Inc., Kansas City, Mo.), and were sealed on an impulse-heated bar sealer (Multivac) under slight vacuum after evacuation to 850 mbar vacuum and released with nitrogen. Sufficient vacuum was placed on the package to obtain a snug fit around the product.

After equilibration at room temperature for 7 days, the bars contained 29.7 wt % water as determined by the Karl Fischer procedure, and had an $A_w$ of 0.87 and a pH of 5.3. Each bar weighed approximately 2.68 oz and had a soft refried bean-like flavor.

A microbiological analysis of the product showed the following results.

A very low aerobic plate count of 270 colonies/g, less than 10 colonies/g yeast and *Staphylococcus aureus*, 290 colonies/g molds and less than 3 colonies/g *Escherichia coli*, and negative to Salmonella.

When the tests were repeated after storage for one month at about 21° C., the samples had the following characteristics:

An aerobic plate count of 130 colonies/g.

an aerobic plate count of 100 colonies/g, less than 10 colonies/g yeast, mold and *Staphylococcus aureus*, and less than 3 colonies/g *Escherichia coli*.

PREPARATION OF SHELF-STABLE REFRIED-BEAN-TYPE BAR FROM EXTRUDER-COOKED DRY GROUND BEANS

Example 3

Preparation of Extruder Precooked Bean Meal

TABLE 2

| Ingredients | Formulation (lbs) |
|---|---|
| Dry pinto beans | 42.00 |
| Dry Great Northern white beans | 42.00 |
| Refined cottonseed oil (Lou Ana Food Co.) | 1.20 |
| Concentrated glyceryl monostearate emulsifier (Eastman Chemical Products, Inc., Myvaplex 600 ™) | 0.80 |
| Water | 14.00 |
| Total | 100.00 |

A precooked, grainy textured dry legume meal or flour, in which the starch has been minimally disrupted and the natural toxic and anti-growth components of the seed are deactivated, was prepared. A variety of dry bean flours and preparations may be substituted, from which the flatulence sugars have been removed, e.g., by a method such as that described in U.S. Pat. No. 4,645,677 to Lawhon and Lusas, The legumes, however, should receive enough heat to deactivate trypsin inhibitors to a range of about 5 to 10 trypsin inhibitor units (TIU) or less, and essentially completely destroy all natural toxic components.

This example demonstrates the mixing of two varieties of dry field beans with the relatively bland Great Northern white bean variety that reduces the strong pinto bean flavor. No product streams are created by this direct process that may cause disposal problems or increase processing costs. Alternatively, pinto or other beans may be presoaked in water, and the soak water containing the leached dark pigments and strong-flavored compounds discarded. In the latter case, the moisture content of soaked beans may be increased to as much as 58 wt %, requiring wet milling procedures, operation of the extruder at lower temperatures and lower rpm to reduce shear and partial drying of the product before or after extrusion.

Lighter-colored products may be made by various dehulling techniques, including moistening whole beans with approximately 10 wt % water, surface drying, cracking and removing the hulls by aspiration, optionally tearing apart the softened hulls with the aid of rollers or abrasion mills and removal by fluming in water and screening. The removal of hulls is important when using varieties with dark hulls like black beans, red kidney beans, or seeds with black hilums like black-eye peas. Dehulling, however, is not required for the final product in this example.

The whole beans were ground through a comminuting machine (W. J. Fitzpatrick Co., Chicago, Ill.) equipped with a 0.027 in screen to a dry, raw, whole bean meal. The meal was then mixed with cottonseed oil and an emulsifier in beadlet form in a Hobart upright mixer, followed by the addition of formula water. The oil and emulsifier are added to reduce expansion or puffing of mechanically-damaged starch during extrusion, and to obtain a grainy texture in the final bean food product. Cottonseed oil is representative of many types of edible oils that may be used, preferably in liquid or melted form. The emulsifier used was selected from among a family of emulsifiers that have been developed to prevent retrogradation of baked cereal foods and to avoid sticky texture in dehydrated instant mashed potatoes.

The moisture content of the milled bean flour-oil-emulsifier mixture was raised to approximately 23 wt % by addition of water, which is within a 20 to 27 wt % moisture range generally recognized to favor starch gelatinization, compared to the 8 to 18 wt % level which favors dextrinization.

The mixture was cooked in a twin-screw extruder (Wenger Manufacturing Company TX-52). A single-screw extruder may also be utilized, since the objective is to achieve only a small degree of product shear and expansion. The extruder was operated at a feed rate of 200 lb/hr and 350 rpm. The temperature of extrusion was 302° F. at the barrel with an exit pressure of 1000 psi at the die. The resulting partially-expanded pellets had about 1.5 times the diameter of the 5/32 in die opening. The pellets were cooled and ground through a Bauer mill to obtain a meal. The moisture content of the finished meal was about 16.1 wt %.

Example 4

Preparation of Shelf-Stable Food Bar from Extruder Precooked Bean Meal

The following formulation was prepared in the proportions shown in Table 3.

TABLE 3

| Ingredients | Formulation (lbs) |
| --- | --- |
| Pinto/Great Northern white bean meal prepared as in Ex. 3 | 10.125 |
| Water | 4.860 |
| Lard | 2.000 |
| Sugar | 1.500 |
| Corn syrup (Archer Daniels Midland 42 DE/43 Be') | 1.250 |
| Modified starch (American Maize Co. Polar Gel C ™) | 0.850 |
| Propylene glycol | 0.850 |
| Sorbitol | 1.000 |
| Dextrose | 1.250 |
| Dry smoke flavor | 0.500 |
| Salt | 0.375 |
| Dry onion powder | 0.125 |
| Citric acid | 0.125 |
| Con. glyceryl monostearate emulsifier (Eastman Chem. Prod., Inc., Myvaplex 600 ™) | 0.100 |
| Dry garlic powder | 0.050 |
| Potassium sorbate | 0.038 |
| Refined cottonseed oil with 10 wt % TBHQ and BHT (Eastman Chem. Prod., Inc.) | 0.002 |
| Total | 25.000 |

The emulsifier was included to retard the hardening of the bar after processing, presumably by complexing any starch disrupted during mixing and/or extrusion of the food ingredients. The potassium sorbate was dissolved in the propylene glycol and all the ingredients were combined in a twin-sigma blade mixer (J. H. Day Company), and mixed under 10 in Hg vacuum to deaerate the mixture. The resulting dough was then fed into an extruder (Wagner X-20, Wenger Manufacturing Company), with barrel and screw configured to rapidly heat the product with minor shear of the granular texture.

The product exited the extruder through a straight ⅜ in pipe at 210° F. and was pressed into ⅜ inch thick sheets, cooled, and sliced into 4×1 3/16 inch bars. The bars were placed in multi-laminate clear pouches (FreshPak 500 Koch Supplies, Inc., Kansas City, Mo.), and were sealed on a bar sealer (Multivac impulse-heated) under slight vacuum after evacuation to 850 mbar, and released with nitrogen. Sufficient vacuum was placed on the package to obtain a snug fit around the product.

After equilibration at room temperature for 7 days, the bars contained 25.0 wt % water as determined by the Karl Fischer procedure, and had an $A_w$ of 0.83 and a pH of 5.3. Each bar weighed approximately 2.68 oz and the product had a soft refried bean-like flavor.

A microbiological analysis of the product showed a very low aerobic plate count of about 270 colonies/g, less than 10 colonies/g yeast, mold and *Staphylococcus aureus*, less than 3 colonies/g *Escherichia coli*, and were negative to Salmonella.

This combination of steps is not limited to applications with the above formulation. For example, the appearance of the product can be enhanced by adding pieces of rendered bacon or unflavored red-colored pieces of textured soy protein. Products simulating pork and beans, canned bean dips, and thick bean, pea and lentil soup also can be made by this technology, or by first soaking the legume seed as described in Example 1 above.

PREPARATION OF SHELF-STABLE CHILI AND BEAN TYPE BAR

Example 5

Preparation of Extruded Bean Pieces

Bean pieces were prepared as described from the ingredients shown in Table 4 below.

TABLE 4

| Ingredients | Formulation (lbs) |
|---|---|
| Dry pinto beans | 81.50 |
| Refined cottonseed oil (Lou Ana Foods Co.) | 0.60 |
| Con. glyceryl monosterate emulsifier (Eastman Chem. Prod. Co., Myvaplex 600 TM) | 0.40 |
| Water | 17.50 |
| Total | 100.00 |

Structured, aerated, cohesive, dry legume slices or shreds were obtained by cooking the starch with minimum disruption and deactivating the natural toxic and anti-growth components of the legumes. Upon mastication, the particles had a grainy texture reminiscent of a bean, pea or lentil product.

Whole, undehulled dry raw beans were ground through a Fitzpatrick comminuting machine equipped with a 0.027 in screen to a bean meal. The resulting meal was mixed with a reduced level of cottonseed oil and an emulsifier in beadlet form in a Hobart upright mixer. The moisture content of the milled bean flour-oil-emulsifier mixture was raised to approximately 25 wt % with water. The mixture was cooked in a twin-screw extruder (Wenger Manufacturing Company TX-52), but may also be processed in a single-screw extruder since the objective is to achieve reduced shear and expansion. The extruder was operated at a feed rate of 200 lb/hr and at 350 rpm. The temperature of extrusion was 302° F., with an exit pressure of 1500 psi at the die to favor a slight expansion and more brittle pellets as compared to the previous example of making a cooked meal.

The thus resulting partially-expanded pellets had an about 2.5 times the 5/32 in diameter die opening. The pellets were cooled a length passed through a Comitrol TM cutting mill (Urschel Laboratories Inc., Valparaiso, IN) equipped with a 0.180 inches cutting head. The moisture content of the sliced pieces was 18 wt %.

Example 6

Making of Texturized Brown-Colored Soy Protein Concentrate-Beef

The following preparation was formulated in the proportions shown in Table 5 below.

TABLE 5

| Ingredients | Formulation (lbs) |
|---|---|
| Soy protein concentrate (Central Soya Promosoy 100 TM) | 58.00 |
| Beef clod (7 wt% fat) | 41.800 |
| Caramel color (Sethness Co. P-330) | 0.200 |
| Total | 100.000 |

In addition, the product also contained an extruder-texturized ingredient containing soy protein concentrate and fresh beef. The soy protein concentrate used was purchased already ground to pass a U.S. 100 mesh sieve. Beef, containing approximately 7 wt % fat, was passed through a 3/16 in grinder plate and placed in a silent cutter or "bowl chop". The caramel color was sprinkled over the mixture and the mixture was chopped until a coarse emulsion was formed. In a commercial operation, a continuous emulsifier may be used such as those used for preparing sausages. The content of the bowl was added to the soy protein concentrate and mixed in a Hobart upright mixer until dispersed. The material, with about 35 wt % moisture, was passed through a twin-screw extruder (Wenger TX-52), with screws, barrel and die configured for texturization of soy protein as recommended by the manufacturer. The extruder ran at 350 rpm, with a feed rate of approximately 220 lbs/hr, and the extruded product exited the die plate at 750 psi and 218° F. The product was cooled to approximately 90° F. and passed through a Comitrol TM cutting mill with a 0.18 in cutting head. The product resembled, and smelled like, pieces of shredded roast beef.

Example 7

Shelf-Stable Chili and Bean Bar

The chili and bean bar was prepared with the ingredients in the proportions shown in Table 6 below.

TABLE 6

| Ingredients | Formulation (lbs) |
|---|---|
| Ground beef, 15 wt % fat (3/16" plate) | 8.750 |
| Extruded pinto bean shreds | 5.180 |
| Texturized soy con.-beef shreds as prepared above | 2.750 |
| Sugar | 2.000 |
| Dextrose | 1.255 |
| Modified starch (American Maize Co. Polar Gel C TM) | 0.725 |
| Sorbitol | 0.725 |
| Refined cottonseed oil (Lou Ana Foods Co.) | 0.625 |
| Propylene glycol | 0.625 |
| Barbecue smoke flavor | 0.500 |
| Glycerol | 0.500 |
| Chili powder (Gilroy Foods Co.) | 0.400 |
| Salt (Morton Salt Co.) | 0.375 |
| Dehydrated onion powder | 0.300 |
| Garlic powder | 0.125 |
| Citrc acid | 0.125 |
| Potassium sorbate | 0.038 |
| Refined cottonseed oil containing 10% TBHQ and BHT (Eastman Chemical Products) | 0.002 |
| Total | 25.000 |

The potassium sorbate was dissolved in the propylene glycol and all ingredients were combined in a twin-sigma blade mixer (J. H. Day Company), and mixed under 10 in Hg vacuum to deaerate the mixture. The mixture then was fed into an extruder (Wenger Manufacturing Company X-20), with barrel and screw configured to rapidly heat the product with minor shear. The product exited the extruder through a straight ⅜ inch pipe at 210° F. The product was pressed into sheets ⅜ inch thick, cooled, and sliced in to 4 by 1 3/16 in bars. The bars were placed in multi-laminate clear pouches (Freshpak 500, Koch Supplies, Inc., Kansas City, Mo.), and sealed on an impulse-heated bar sealer (Multivac) under slight vacuum after evacuation to 850 mbar, and released with nitrogen.

After equilibration at room temperature for 7 days, the bars contained 26.5 wt % water as determined by the Karl Fischer procedure, and had an $A_w$ of 82.5 and a pH of 5.4. Each bar weighed approximately 2.68 oz.

A Microbiological analysis of the product showed a very low aerobic plate count of about 270 colonies/g, less than 10 colonies/g yeast, mold and *Staphylococcus aureus*, less than 3 colonies/g *Escherichia coli*, and were negative to Salmonella.

SHELF-STABLE BEAN-SHAPED PRODUCTS

The following examples show an application of the process to making small-piece finger foods from legumes. These products may be made in various shapes, and enrobed in flexible or rigid coatings, resembling confections.

Example 8

Precooked Bean Meal

A bean meal was prepared utilizing the ingredients in the proportion shown in Table 7 below.

TABLE 7

| Ingredients | Formulation (lbs) |
| --- | --- |
| Dry pinto beans | 84.80 |
| Refined cottonseed oil (Lou Ana Food Co.) | 0.80 |
| Con. glyceryl monostearate emulsifier (Eastman Chem. Prod. Inc., Myvaplex 600 TM) | 0.40 |
| Water | 14.00 |
| Total | 100.000 |

The dry pinto beans were ground in a Fitzpatrick comminuting machine with a 0.027 in screen. The floury meal was then mixed with the oil and the emulsifier in a Hobart upright mixer, combined with water and extruded with a twin-screw extruder (Wenger Manufacturing Company TX-52). The same ingredients, however, could also have been processed with a single screw extruder of appropriate design.

The extrudate expanded about 1.5 times the diameter of the 5/32 in round hole die, and was cut into pellets which after cooling to 90° F. were ground into a flour using a Bauer mill. The moisture content of the finished meal was 16.3 wt %. The extrusion-precooked beans were then ground in a Fitzpatrick comminuting machine with a 0.027 in screen and the resulting flour used to prepare a mix from which the final product was extruded.

Example 9

Preparation of Extrusion Mixture

The ingredients and their proportions for the preparation of an extrusion mixture are shown in Table 8 below.

TABLE 8

| Ingredients | Formulation (lbs) |
| --- | --- |
| Extruded pinto bean flour as prepared in Example 8 | 11.984 |
| Water | 3.350 |
| Brown sugar | 1.750 |
| Cottonseed oil | 0.750 |
| Modified starch (American Maize Co. Polar Gel C) | 2.000 |
| Corn syrup (Archer Daniels Midland 42 DE/43 Be') | 1.250 |
| Dextrose | 0.750 |
| Fructose | 0.750 |
| Sorbitol | 0.613 |
| Propylene glycol | 0.250 |
| Glycerine | 0.500 |
| Barbecue flavor | 0.150 |
| Salt | 0.188 |
| Citric acid | 0.150 |
| Dry onion powder | 0.100 |
| Dry garlic powder | 0.050 |
| Potassium sorbate | 0.038 |
| Glyceryl monostearate emulsifier (Eastman Chem. Prod. Co., Myvaplex 600 TM) | 0.375 |
| Refined cottonseed oil with 10 wt % TBHQ and BHT (Eastman Chem. Prod., Inc.) | 0.002 |
| Total | 25.000 |

The potassium sorbate was dissolved in water and all ingredients were combined in a twin-sigma blade mixer (J. H. Day Company), and mixed under 10 in Hg vacuum to deaerate the mixture. The mixture then was fed into an extruder (Wenger Manufacturing Company TX-52), with barrel and screw configured to cook the product to 220° F. and cool it to less than 200° F. to prevent expansion at the die. The product exited the extruder through two 5/16 in kidney-shaped dies at 210° F. and was cut into approximately 5/16 in long pieces. As an alternative, a ¼ in round hole die was used, and the product was cut into lengths approximately ⅜ in long.

The resulting product had a clean cutting but gummy texture. It could be dusted with a finely ground or coarse sugar, or be enrobed with sugar or dextrins, and coated with edible shellac as are jelly beans. In this form, the product may be eaten as finger food. However, the product is nutritious since it contains bean protein, and lacks the sweetness of candy. Different textures may be imparted in the product by the type of bean used, for example, a grainy texture, by using beans that cook to a soft texture like navy and pinto beans, and a sticky texture by using mung beans.

The pieces were placed in a multi-laminate clear pouches (FreshPak 500, Koch Supplies, Inc., Kansas City, Mo.), and were sealed on a Multivac impulse-heated bar sealer under slight vacuum after evacuation to 850 mbar, and were released with nitrogen.

After equilibration at room temperature for 7 days, the product contained 23.0 wt % water as determined by the Karl Fischer procedure, and had an $A_w$ of 0.76. Each package weighed approximately 3 oz. The pieces had a soft and chewy texture, and could be used as a nutritious food for children, as snacks, and as desserts as bean-based confections are used in Eastern Asia.

A microbiological analysis of the product showed an aerobic plate count of 680 colonies/g, less than 10 colonies/g yeast, mold and *Staphylococcus aureus*, less than 3 colonies/g *Escherichia Coli*, and negative to Salmonella.

SHELF-STABLE CEREAL PRODUCTS

Example 10

Preparation of Corn Meal

The products of Examples 10 and 11 are representative of a group of shelf-stable cereal-based bars that may be made from yellow or white corn grits, wheat farina, rice, oatmeal, and pearled sorghum, millet, amaranth or barley.

Yellow corn grits were prepared to pass through a U.S. 10 mesh screen but not finer than a U.S. 40 mesh screen. 20 lbs of yellow corn grits and 0.50 lb concentrated glyceryl monostearate emulsifier (Myvaplex 600 TM, Eastman Chemical Products, Inc.) was mixed with 12.7 lbs water to bring the moisture content to 45 wt %, and cooked for 20 min in a covered steam-jacketed twin-sigma blade mixer (J. H. Day Company) until the centers of the grits were soft. The steam jacket pressure was 20 psig and the temperature of the internal chamber reached 120° C.

The remaining ingredients of the following formula were then added to the mixer in the proportions shown in Table 9 below.

TABLE 9

| Formulation | |
|---|---|
| Ingredients | (lbs) |
| Cooked yellow corn grits | 15.282 |
| Dry corn grits | 9.934 |
| Added moisture | 4.548 |
| Glyceryl monostearate emulsifier (Myvaplex 600) | 1.250 |
| Sugar | 1.100 |
| Corn syrup (Archer Daniel Midland 62 DE/43 Be') | 3.500 |
| Modified starch (American Maize Co., Polar Gel C TM) | 0.750 |
| Maltodextrin (American Maize 5-DE) | 0.443 |
| Sorbitol | 1.037 |
| Glycerol | 1.000 |
| Salt | 0.375 |
| Citric acid | 0.050 |
| Lactic acid | 0.050 |
| Potassium sorbate 50 wt % solution in water | 0.150 |
| Refined cottonseed oil with 1 wt % TBHQ and BHT (Eastman Chem. Prod., Inc.) | 0.013 |
| Total | 25.000 |

All ingredients were combined in a twin-sigma blade mixer (J. H. Day Company), and mixed under 10 in Hg vacuum to deaerate the mixture. The mixture then was fed into an extruder (Wenger Manufacturing Company X-20), with barrel and screw configured to cook the product to 220° F. and cool it to less than 200° F. to prevent expansion at the die. The product exited the extruder through a straight ⅜ in pipe at 210° F.

The product was pressed into ⅜ in thick sheets, cooled, and sliced into 4 by 1 3/16 in bars. The bars were placed in multi-laminate clear pouches (FreshPak 500, Koch Supplies, Inc., Kansas City, Mo.), and were sealed on a Multivac impulse-heated bar sealer under slight vacuum after evacuation to 850 mbar, and released with nitrogen.

After equilibration at room temperature for 7 days, the bars contained 23.2 wt % water as determined by the Karl Fischer procedure, and had an $A_w$ of 0.86 and a pH of 4.34. Each bar weighed approximately 2.68 oz.

A microbiological analysis of the product showed an aerobic plate count of 840 colonies/g, and an anaerobic plate count of 150 colonies/g, less than 10 colonies/g of yeast, mold and Staphylococcus aureus, less than 3 colonies/g Escherichia coli and was negative for Salmonella.

Example 11

Preparation of Polenta Bars

The process of Example 10 was repeated to make polenta bars. After precooking the corn meal, the following ingredients were added in the proportions shown in Table 10 below.

TABLE 10

| Formulation | |
|---|---|
| Ingredients | (lbs) |
| Cooked yellow corn grits | 12.907 |
| Dry corn grits | 8.390 |
| Added moisture | 4.517 |
| Cheddar cheese, shredded | 2.500 |
| Cottonseed oil | 1.318 |
| Sugar | 1.100 |
| Corn syrup (Archer Daniel Midland 62 DE/43 Be') | 3.500 |
| Modified starch (American Maize Co., Polar Gel C TM) | 1.000 |
| Sorbitol | 1.037 |
| Glycerol | 1.000 |
| Salt | 0.375 |
| Citric acid | 0.050 |
| Lactic acid | 0.050 |
| Potassium sorbate 50 wt % solution in water | 0.150 |
| Refined cottonseed oil with 1 wt % TBHQ and BHT (Eastman Chem. Prod., Inc.) | 0.013 |
| Total | 25.000 |

After equilibration for 7 days at room temperature, the bars contained 31.2 wt % water as determined by the Karl Fischer procedure, and had an $A_w$ of 0.87 and a pH of 4.74. Each bar weighed approximately 2.68 oz.

A microbiological analysis of the product showed an aerobic plate count of 290 colonies/g and an anaerobic plate count of 890 colonies/g, less than 10 colonies/g, yeast, mold and Staphylococcus aureus, less than 3 colonies/g Escherichia coli, and negative for Salmonella.

The polenta product contained 10 wt % cheddar cheese. Foods made from dry corn are traditionally eaten in Mexico and Central American and are also used in "Mexican Food" cookery in the United States as sources of energy. The corn grits may be treated with food-grade alkali to impart them with "nixtamalized" flavor characteristic of corn tortillas. The nutritional value of the bar, both in protein content and quality based on the ratio of essential amino acids present, may be improved by using recently-developed high-lysine, Opaque-2, or Quality-Protein "QP" maize varieties of dry field corn. Dry field beans, soybeans, and other legumes and oilseeds containing proteins rich in lysine may also be included as part of the formulation.

Example 12

Preparation of Shelf-Stable Red Beans and Rice Bar

Legume seed protein is rich in lysine but lacks sulfur-containing essential amino acids such as methionine and cysteine. In contrast, cereal seed proteins are high sulfur-containing essential amino acids but low in lysine. Nutritionists have documented that a beneficial complementation occurs in the time-honored practices throughout the world of blending cereal and legume proteins in low-cost native diets. Mixtures of 2-3:1 parts by volume of cereal grains like maize or rice with legumes result in foods having an improved nutritional quality over either seed alone. "Red beans and rice", typically served with gravy, is a popular dish in some regions of the United States and also provides a well-balanced source of protein.

An example of the application of this invention to the preparation of a "red bean and rice" shelf-stable food bar is presented in Example 12 below.

Example 13

Preparation of Red Bean Component

Twenty five pounds of small red beans were soaked in water at room temperature for 15 hrs, drained, and placed in a Gemco tumble dryer modified to enable heating of the double cone with direct steam. The soaked beans were cooked for 45 min with a steam jacket pressure of 20 psig, reaching an internal chamber temperature of 120° C. to make the beans soft and achieve a cooked bean flavor. The beans were then passed through a meat grinder equipped with a plate containing 3/16 in holes. The moisture content of the original dry beans was 12.0 wt %, and that of the ground cooked beans was 38.4 wt %.

The following ingredients in the proportions shown in Table 11 below were then mixed in a twin sigma arm mixer (J. H. Day Company, Cincinnati, Ohio).

TABLE 11

| Ingredients | Formulation (lbs) |
|---|---|
| Precooked Pinto Beans | 15.250 |
| Dry beans | 9.394 |
| Water from soaking | 5.856 |
| Refined cottonseed oil (Lou Ana Food Co.) | 1.500 |
| Glucose | 2.000 |
| Corn syrup (Archer Daniel Midland 62 DE/43 Be') | 2.545 |
| Modified starch (American Maize Co. Polar Gel C ™) | 1.000 |
| Glycerol | 0.750 |
| Sorbitol | 1.000 |
| Salt | 0.375 |
| Soy sauce | 0.375 |
| Red lake color | 0.018 |
| Citric acid | 0.050 |
| Lactic acid | 0.050 |
| Potassium sorbate solution 50% in water | 0.075 |
| Refined cottonseed oil with 1% TBHQ and BHT (Eastman Chem. Prod., Inc.) | 0.012 |
| Total | 25.000 |

The remaining ingredients were combined in a twin-sigma blade mixer (J. H. Day Company), and mixed under vacuum (10 in Hg) to deaerate the mixture. The resulting dough then was fed into an extruder (Wenger Manufacturing Company X-20), with barrel and screw configured to rapidly heat the product with minor shear. The product exited the extruder through a straight ⅜ inch pipe at 210° F. The product was pressed into sheets ¼ inch thick.

The bean component contained 30.3 wt % water, as determined by the Karl Fischer procedure, and had an $A_w$ of 0.81 and a pH of 5.31.

Example 14

Preparation of Rice Component 10.17 lbs of rice, size-reduced to pass a 20 U.S. sieve and be retained on a 40 U.S. sieve was mixed with 5.08 lbs water to bring the moisture content to 45%, and was cooked in a covered steam jacketed J. H. Day Company twin-sigma blade until the centers of the grits were soft.

The remaining ingredients of the following formula were then added to the mixer:

TABLE 11

| Ingredients | Formulation (lbs) |
|---|---|
| Cooked Rice Grits | 15.250 |
| Rice grits | 10.170 |
| Added moisture | 5.080 |
| Lou Ana Food Co. refined cottonseed oil | 1.500 |
| Glucose | 2.250 |
| Corn syrup (Archer Daniel Midland 62 DE/43 Be') | 2.938 |
| Modified starch (American Maize Co. Polar Gel C ™) | 0.750 |
| Glycerol | 0.750 |
| Sorbitol | 1.000 |
| Salt | 0.375 |
| Citric acid | 0.050 |
| Lactic acid | 0.050 |
| Potassium sorbate solution (50% in water) | 0.075 |
| Refined cottonseed oil with 1% TBHQ and BHT (Eastman Chem. Prod., Inc.) | 0.012 |
| Total | 25.000 |

The complete mixture was reheated to 97° C. The product was pressed into sheets ¼ in thick.

The rice component contained 27.7% water, determined by the Karl Fischer procedure, and had an $A_w$ of 0.85 and a pH of 4.59.

Example 15

Preparation of Laminated Red Bean and Rice Bar

A layer of pressed red beans component was placed on a layer of rice component, and was covered by a second layer of rice component. The stack was additionally pressed to form a cohesive sheet, ⅜ in thick, and after sufficient cooling was cut into bars 4 in by 1 3/16 in The bars were placed in FreshPak 500 multi-laminate clear pouches (from Koch Supplies, Inc., Kansas City, Mo.), and were sealed on a Multivac impulse-heated bar sealer under slight vacuum after evacuation to 850 mbar vacuum and released with nitrogen.

Small red beans were used in the above example, but it is realized that larger red-skinned beans, like kidney beans, or cranberry beans whose skin turns red on cooking, could be used. Alternatively, suitable approved food coloring materials could be used to create a color contrast between the middle layer of "red beans" and the outer layers or white rice.

A layered bar product was prepared by hand in the above example at a Test Kitchen level by making individual colored layers, stacking contrasting layers and pressing the stack. It is realized that bars with two or more layered or variegated colors can be made by simultaneous extrusion. Additionally, hydrocolloids like agar, carboxymethylcellulose, carrageenan and others can be added to the bean fraction to enable extrusion and cutting of individual bean-like pieces that could then be combined with the rice fraction.

The invention now being fully described, it will be apparent to one of ordinary skill in the art that many changes and modifications can be made thereto without departing from the spirit or scope of the invention as set forth herein.

We claim:

1. A method of producing an edible, non-meat, shelf-stable, field-dried legume food product, comprising cooking a substrate selected from the group consisting of field-dried legume seeds under conditions effective to maintain a total content of water in the substrate at about 20 to 60 wt % and to inactivate microorganisms, lectins, enzymes, trypsin inhibitors, and hemagglutinins, while increasing protein and starch digestibility and palatability;

admixing the cooked substrate with an ingredient selected from the group consisting of solids or liquid fats, sweeteners, humectants, emulsifiers, salts, edible acids, flavorings and preservatives to obtain a final product water activity ($A_w$) of less than 0.87;

cooking the admixture under conditions effective to pasteurize the admixture and produce a flowable food product having a total water content of about 20 to 45 wt % while minimizing shearing and avoiding expansion or puffing of the contained starch; and cooling and forming the food product into a desired shape.

2. The method of claim 1, further comprising
reducing the size of the seeds to produce a paste.

3. The method of claim 1, wherein
the first cooking step is conducted at a temperature of about 180° to 275° F.; and
the temperature is then lowered to about 130° to 215° F.

4. The method of claim 1, wherein
the field dried legume seeds are selected from the group consisting of beans, peas, and lentils.

5. The method of claim 1, wherein
the second cooking step is conducted at a temperature of about 180° to 240° F.; and
the temperature is then lowered to about 160° to 215° F.

6. The method of claim 1, wherein
the first cooking step is conducted by mixing water with the seeds in a proportion of about 1.00:0.75 to 1.00:14.00 wt:wt.

7. The method of claim 1, wherein
the first cooking step is conducted by steam cooking.

8. The method of claim 1, wherein
the first cooking step is conducted by extrusion cooking.

9. The method of claim 1, wherein
the first cooking step is conducted by boiling.

10. The method of claim 1, wherein
the second cooking step is conducted by extrusion cooking.

11. The method of claim 1, wherein
the second cooking step is conducted by contact heating.

12. The method of claim 1, further comprising
soaking the seeds in an aqueous medium prior to the first cooking step.

13. The method of claim 1, further comprising
grinding the dry seeds into a meal, flour or grits while preserving the starch structure in granule or mealy form prior to the first cooking step.

14. An edible, non-meat shelf-stable field-dried legume food product prepared by the method of claim 1.

15. The edible food product of claim 14, having
a water activity ($A_w$) of about 0.65 to 0.87;
a pH of about 4.0 to 6.2; and
a moisture content of about 20 to 45 wt %.

* * * * *